G. S. BARKER.
VALVE.
APPLICATION FILED AUG. 10, 1918.

1,328,780. Patented Jan. 20, 1920.

Witnesses

Inventor
G. S. Barker
By Victor J. Evans
Attorney

UNITED STATES PATENT OFFICE.

GEORGE S. BARKER, OF DENVER, COLORADO.

VALVE.

1,328,780.   Specification of Letters Patent.   Patented Jan. 20, 1920.

Application filed August 10, 1918. Serial No. 249,288.

*To all whom it may concern:*

Be it known that I, GEORGE S. BARKER, a citizen of the United States, residing at Denver, in the county of Denver and State of Colorado, have invented new and useful Improvements in Valves, of which the following is a specification.

This invention relates to valves adapted to be applied to bags or similar receptacles and to be used for introducing air into the bag and retaining the same therein and it consists in the novel features hereinafter described and claimed.

An object of the invention is to provide a valve of the character stated which is of simple and durable structure and which occupies but little space, therefore the valve may be used to advantaage upon relatively small articles as for instance pneumatic arch supports.

With the above and other objects in view the valve structure comprises clamp members adapted to be applied to the inner and outer sides respectively of the bag, the inner clamp member having a stem which passes through the side of the bag and which is engaged by the outer clamp member. A valve member is removably mounted with relation to the inner clamp member and is provided with a stem received in the stem of the inner clamped member. A washer is interposed between the head of the valve member and the clamp member and serves to effect an air-tight joint when the valve member is in a closed position with relation to the clamp member. A retaining member is used in conjunction with the stem of the valve member for holding the valve member in a closed position and the said retaining member may be connected with the nipple of an air hose whereby air may be inserted through the valve structure into the bag or receptacle to which the valve structure is applied.

In the accompanying drawings:—

Figure 1:
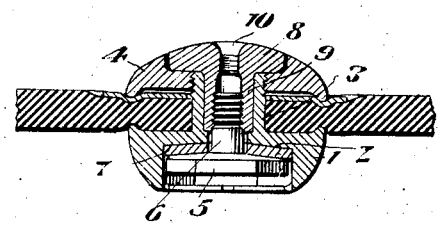
Figures 1 and 2 are transverse sectional views of the valve.
Figure 2:
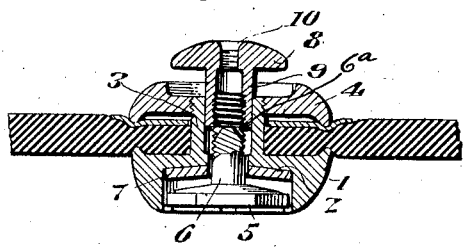
Figures 3, 4:
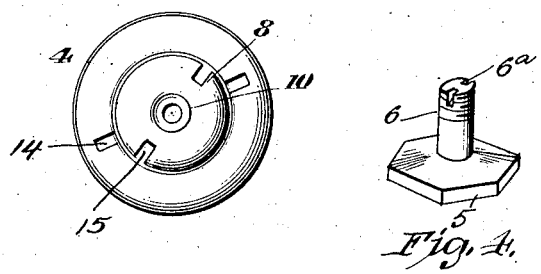
Fig. 3 is a plan view of the same.
Fig. 4 is a detail perspective view of a valve.

The valve structure comprises an inner clamp member 1 adapted to be applied to the inner surface of a bag and which is provided with a seat 2. The member 1 is further provided with a stem 3 adapted to pass through the side of the bag.

The valve structure also includes an outer clamping member 4 which is adapted to engage the outer surface of the bag and which is screw threaded upon the stem 3. A valve proper 5 is provided with a stem 6 having an opening or notch 6ª upon opposite sides of the end of the stem to provide free passage of air when the valve is opened which is received within the stem 3. A washer 7 is interposed between the head of the valve proper 5 and the seat 2. This washer may be of any suitable material, but is preferably composed of part rubber and part leather, in order to prevent the same from sticking to the adjacent part, but which will effect an air tight joint when the parts are in closed position with relation to each other. The valve proper 5 is provided with a rectangular shaped head which contacts with similarly formed walls extending from the valve seat, to prevent the latter from turning when the retainer 8 is loosened or tightened. This retainer is provided with a stem 9, which is adapted to screw in engagement with the stem 6 of the valve proper. This stem is internally threaded to engage an exterior thread provided on the stem 3. The outer surface of the stem 9 and the interior of the stem 3 are smooth to allow for adjustment of the stem 9 and the stem 6. The retaining member 8 is provided with a central opening 10, which is in communication with the opening through the stem 6 and permits of the free passage of air when inflating the bag.

Both the clamping member 4 and the retainer 8 are provided at their adjacent edges with diametrically located slots or notches 14 and 15, respectively, for the reception of a suitable key to be used in adjusting these elements.

Assuming that the parts are applied to a bag and the latter is to be inflated, the retaining member is connected with the nipple of an air hose, such as for instance, as is used on an atomizer or similar device. The stem 9 is forced into the stem 3 engaging the stem 6 on the valve proper 5, which permits tightening or loosening of the valve 5 to allow air to pass into or out of the bag. The retainer 8 is screwed down to close and slightly unscrewed to open the valve. The air hose nipple is disconnected after the bag has been inflated and the retainer is screwed tight with a suitable key provided for that purpose, which securely closes the valve.

From the foregoing description, taken in connection with the accompanying drawings, it will be seen that a valve construction of simple arrangement is provided and that the same occupies but little space, whereby it may be used to advantage upon small articles of the character stated.

Having described the invention what is claimed is:—

1. A valve comprising clamping members one of which is provided with a stem, the other clamping member detachably engaging the stem, a valve proper provided with a stem which is movably mounted in the first mentioned stem, and a combined retaining and hose connecting member adapted to detachably engage in the first mentioned stem and adapted to engage the second mentioned stem to move the valve proper to an open position or to hold the valve proper in a closed position.

2. A valve comprising clamping members one of which is provided with a stem, the other clamping member detachably engaging the stem, the first mentioned clamping member having a valve seat, a valve having a stem received in the first mentioned stem and adapted to close against said seat, a retaining member detachably engaging within the first mentioned stem and adapted to detachably engage the second mentioned stem for operating the valve and adapted to be used as means for conducting air through the first mentioned stem when it is applied to the same in a position to hold the valve proper at an open position with relation to the seat.

In testimony whereof I have affixed my signature.

GEORGE S. BARKER.